(12) United States Patent
Chubb et al.

(10) Patent No.: US 6,214,424 B1
(45) Date of Patent: *Apr. 10, 2001

(54) SIMULATED ICE CRYSTAL FORMATION ON SUBSTRATES

(75) Inventors: Richard A. Chubb, Gloucester City, NJ (US); Thomas Grant, Overbrook, IL (US)

(73) Assignee: Thermoseal Glass Corporation, Gloucester, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,383

(22) Filed: Mar. 24, 1999

(51) Int. Cl.[7] ................................. B29D 22/00
(52) U.S. Cl. .............. 428/34.1; 427/165; 427/261; 427/269; 427/282; 427/287; 427/379; 427/385.5; 427/386; 427/389.7; 427/398.1; 427/407.2; 427/443.2; 427/510; 427/518; 427/558; 427/559; 428/34.4; 428/34.7; 428/35.7; 428/38; 428/46; 428/142; 428/156; 428/195; 428/441; 428/542.2; 428/542.6; 428/500

(58) Field of Search ...................... 427/510, 518, 427/558, 559, 165, 261, 269, 282, 287, 379, 385.5, 386, 389.7, 398.1, 407.2, 443.2; 428/34.1, 34.4, 34.7, 35.7, 38, 46, 142, 156, 195, 441, 542.2, 542.6, 500

(56) References Cited

U.S. PATENT DOCUMENTS 4,451,329 * 5/1984 Batchelor et al. .
4,781,968 * 11/1988 Kellerman .

FOREIGN PATENT DOCUMENTS

3329599 * 3/1985 (DE) .
3-224708 * 10/1991 (JP) .
6-24119 * 2/1994 (JP) .

* cited by examiner

*Primary Examiner*—Bernard Pianalto
(74) *Attorney, Agent, or Firm*—John Lezdey & Assoc

(57) ABSTRACT

A process for producing an article having a three-dimensional optical effect comprising a transparent substrate provided with a translucent simulated ice crystal formation having a controlled amount of fern-like patterns along with articles produced by this process.

16 Claims, 3 Drawing Sheets

SIMULATED ICE CRYSTAL FORMATION ON SUBSTRATES

BACKGROUND OF THE INVENTION

1. Field of the Invention

The present invention is generally concerned with providing an article having a three-dimensional decorative appearance, particularly in producing an article having a continuous or discontinuous pattern simulating a reproducible natural ice crystal formation for use in the decorative glass industry, and most particularly for use on doors and windows.

2. Description of the Prior Art

Frosting articles, particularly those made of glass or plastic, for aesthetic reasons, has long been known and used in many diverse industries. These industries include architecture/construction, packaging, display systems and furniture making. Conventional frosting of these substrates is achieved either chemically by an etching liquid such as an acid solution, or mechanically by abrading such as by sandblasting. Another method known in the prior art which is utilized to provide a textured surface on glass and plastic articles, comprises the steps of applying animal hide glue to the surface of the glass which has been sandblasted, then heating the glue and allowing it to dry. This causes the glue to pull chips from the surface, thereby producing a random frosting pattern with an overabundance of fern-like surface patterns. For these reasons, the conventional glue chip process does not yield an ice crystal formation which closely simulates a natural pattern. Such a process is discussed in U.S. Pat. No. 5,631,057 to Carter, which is directed to yet another method of providing a decorative appearance that involves adhering appliques to the surface of the glass.

The aforementioned methods produce articles that are primarily decorative or advertising in nature, are frequently unique and are difficult to reproduce in exactly the same pattern on a commercial scale. In attempting to reproduce an intricate pattern such as natural ice formation, the problem is magnified. The use of a natural ice crystal formation pattern for imparting the illusion of a very cold environment for beverage dispensing machines and other refrigerated products that are displayed and merchandised behind glass in various refrigerated commercial equipment is very desirable from a marketing standpoint.

None of the prior art techniques discussed above provides a satisfactory three dimensional ice crystal effect on two dimensional optically transparent substrates, which can be duplicated in high volumes. Therefore, there exists a need in the decorative glass industry to provide a process which produces a translucent three-dimensional optical effect which closely simulates natural ice crystal formation on a suitable substrate, wherein the pattern can be reproduced in large quantities.

SUMMARY OF THE INVENTION

In its broadest aspect, the present invention provides a three-dimensional optical effect simulating the appearance of a natural ice formation on the surface of substrates, such as a glass or a plastic. It is preferred that the substrate is optically transparent, although translucent and opaque substrates can be used. The ice crystal formation produced by the present process closely resembles ice crystal formations found in nature by substantially reducing the fern-like surface patterns associated with the prior art methods discussed. In accordance with the present invention in its broadest aspect, the process for producing an article having a three dimensional optical effect pattern comprises the steps of:

a. applying a screen pattern of the ice crystal formation onto a substrate;

b. screen printing a polymer coating composition on the substrate; and c. curing the polymer coating composition to provide a three dimensional translucent simulated ice crystal formation having from 0 to 50 percent of the surface area within said formation containing a fern-like surface pattern;

The polymer coating composition is selected from synthetic thermoplastic or thermosetting polymers, which can be cured by thermally initiated polymerization or by photo-initiated polymerization or by a combination of these processes.

The process yields an article of manufacture which possess high standards of quality control regarding the reproducibility of the ice crystal formation.

It is therefore a primary object of this invention to provide a simulated ice crystal formation which has a three dimensional appearance on a substrate, such as a glass or a plastic material.

Another object of this invention is to provide a clear substrate with a simulated ice crystal formation that more closely resembles a natural ice crystal formation by controlling the amount and the configuration of the fern-like pattern formation and that is reproducible in a commercial process.

Another related object of this invention is to provide a decorative ice crystal effect on optically transparent substrates.

A more particular object of this invention is to provide a process which imparts a translucent three-dimensional simulated ice crystal formation on transparent substrates, such as doors and panels of refrigerated units.

An associated particular object of this invention is to provide a process which produces a three-dimensional simulated translucent ice crystal formation on translucent and opaque substrates such as drinking glasses, mugs, panels and bottles.

A further particular object of this invention is to provide a three dimensional appearance simulating a natural ice crystal formation on a suitable substrate wherein the pattern is continuous.

Yet another particular object of this invention is to provide a three dimensional appearance simulating a natural ice crystal formation on a suitable substrate wherein the pattern is discontinuous.

BRIEF DESCRIPTION OF THE DRAWINGS

The characteristics and advantages of the invention emerge from the following description given by way of example only with reference to the appended drawings in which.

DETAILED DESCRIPTION OF THE PREFERRED EMBODIMENTS

Figure 1:
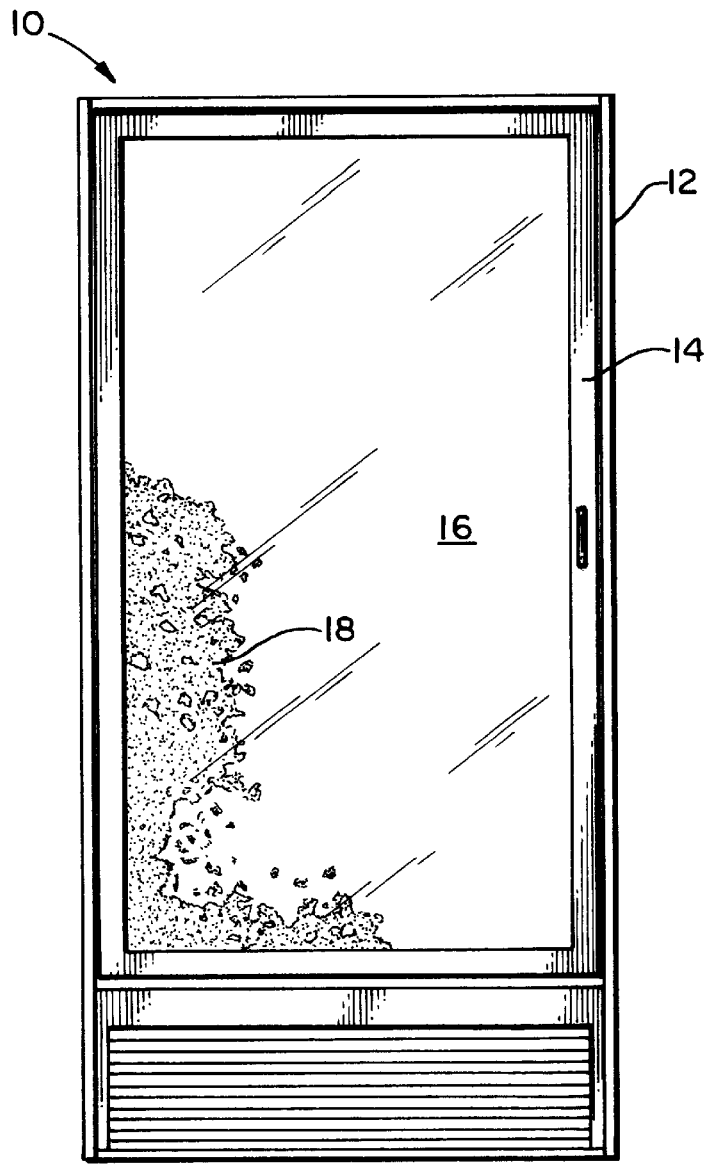
FIG. 1 is a door unit of a refrigerated display case having a transparent glass carrying a translucent discontinuous pattern on the surface simulating the appearance of a natural ice crystal formation.
Figure 2:
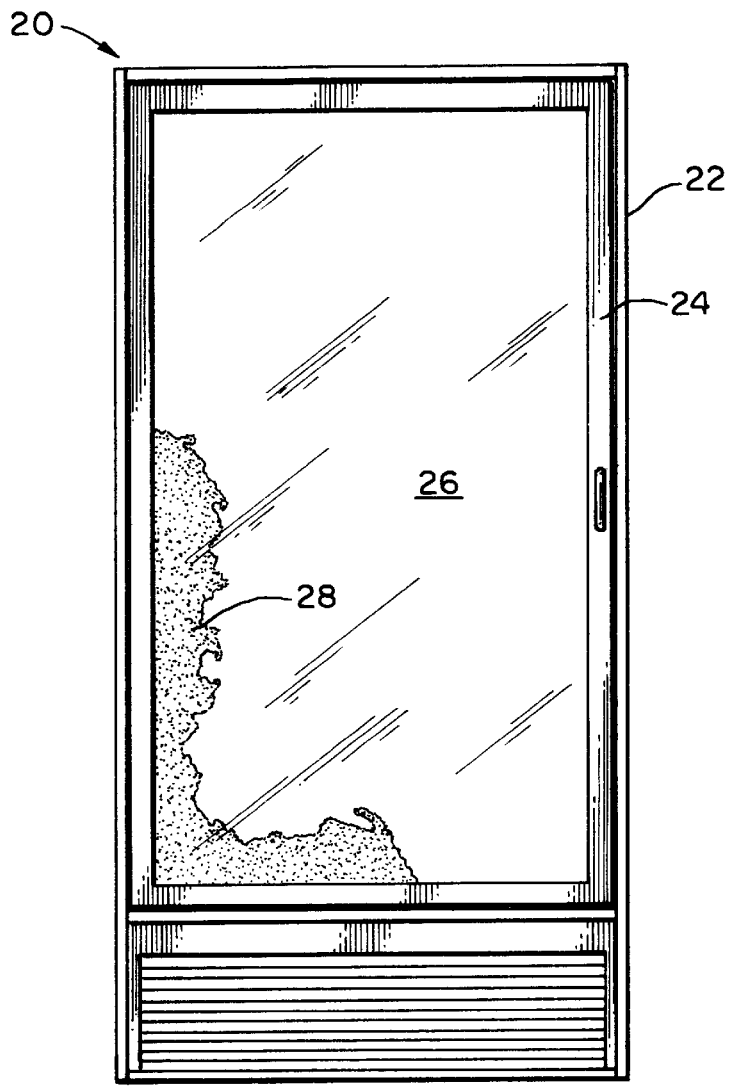
FIG. 2 is a door unit of a refrigerated display case having a translucent continuous pattern of a simulated natural ice crystal formation according to the invention.
Figure 3:
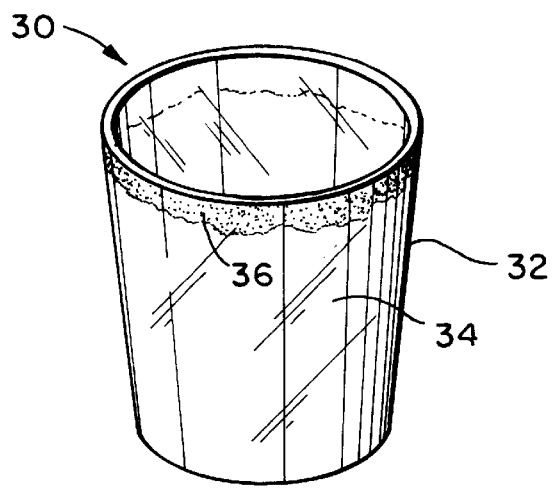
FIG. 3 is a drinking glass having a translucent continuous pattern of a simulated natural ice crystal formation according to the invention.
Figure 5:
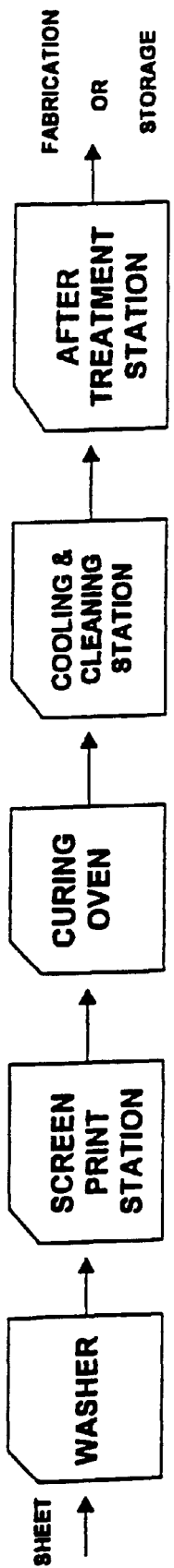
FIG. 5 is a schematic view of the process according to the invention.

In accordance with the present invention, a glass or plastic article is produced having a translucent three-dimensional simulated ice crystal formation by controlling the amount and configuration of the fern-like patterns. Referring to the drawings in detail, FIG. 1 shows an optically transparent door panel unit 10 of a refrigerated display case comprising a transparent glass 16 carrying a translucent discontinuous pattern on the surface of the glass simulating the appearance of a natural ice crystal formulation 18 within door frame 14 and attached on support frame 12. FIG. 2 basically is the same construction as described in FIG. 1 except that the ice crystal formation is shown as a continuous pattern. FIG. 3 shows a drinking glass 30 having a three-dimensional translucent simulated ice crystal formation 36 on glass surface 34. This example illustrates only one application of the present invention. In FIG. 5 a simplified flow diagram is presented showing the major steps in the process of the invention. In one preferred embodiment, flat glass panels supported on a conveyor are moved through a series of operations. First the glass sheets are moved through a WASHER where detergent solutions and rotating brushes may be used to remove any dirt from the surface of the glass sheets, which are then dried with compressed air.

If desired, a solution of an adhesion promoter or primer may be applied to the exposed surface areas to be coated on the substrate before the silk screening operation. Suitable adhesion promoters or primers include reaction products of epoxy resin-silanes and a polysulfide—silane system as disclosed in U.S. Pat. No. 4,059,469 to Mattimoe, et al.

Next, the glass sheet is conveyed to a SCREEN PRINTING station where an ice crystal formation pattern is placed on the areas to be coated. A polymer coating composition is applied by screen printing onto the surface of the glass. Upon completion of the printing step, the glass sheet is then moved through a CURING OVEN where the polymer coating composition is cured either thermally or by photo curing to produce translucent simulated ice crystal formations on the substrate. After exiting the CURING OVEN, the sheet is transferred to a COOLING AND CLEANING station where after cooling, the surface is cleaned. Optionally, a hard coat to prevent scratch, abrasion or other damage may be applied by spraying or brushing at an AFTERTREATMENT station. Suitable coats which have optical clarity are silicone or polypolysiloxane compounds such as described in U.S. Pat. Nos. 4,027,073 and 4,942,083, which are herein incorporated by reference.

The substrates which may be used in the present invention may be of any size or shape, limited only by the capacity of the machinery available. Preferably plates or sheets of commercial plate, float or sheet glass composition are used. Thermoset polymers are also employed as substrates in the process. Suitable thermosetting polymers include acrylic polymers, amino polymers, polyester polymers, polycarbonate polymers, polyurethane polymers and ionomer polymers.

It is preferred when the ultimate utility involves doors and windows that the sheet is optically transparent, however, either the substrate or the coatings may be tinted if desired with colorants such as with dyes or pigments. For other uses such as in drinking glasses and mugs, bottles, inter alia, opaque or translucent substrates may be employed.

Forming the simulated ice crystal formation on a silk screen pattern involves either computer generated imaging or hand drawing the formation pattern on paper or vellum in black and white. Photographing the black and white image to develop a full-size film positive of the ice crystal formation image that is properly sized for the substrate. Finally using the photograph to develop a silk screen for applying the polymer coating onto the substrates, in the same pattern as the desired ice pattern effect.

The polymer coating compositions which may be applied by screen printing in the practice of this invention are based on thermoplastic and thermosetting resins, which may be cured by thermal or photo initiation or by combinations thereof. The thickness of the polymer coating compositions in forming the ice crystal formation ranges from about 0.020 to about 0.125 inch.

Various conventional photocurable resins include acrylate resins and modified acrylate resins such as a urethane—modified polymethacrylate, a butadiene-modified polymethacrylate, a polyether-modified monomethacrylate and polyene-polythiol polymers. Such photocurable resins are described in U.S. Pat. No. 5,461,086 to Kato, et al., the disclosure of which is incorporated by reference. Photoinitiated curing can be accomplished directly or with a photochemical initiator, such as acetophenone and derivatives thereof, benzophenone and derivatives thereof, Michler's ketone, benzyl, benzoin, benzoin alkyl ethers, benzyl alkyl ketals, thioxanthone and derivatives thereof, tetramethyl thiurammonosulfide, 1-hydroxycyclohexyl phenyl ketone, 2-methyl-1-[4-(methylthio)phenyl]-2-morpholino-propene-1 and the like alpha-amino ketone compounds, etc., alone or as a mixture thereof. Among them, benzoyl alkyl ethers, thioxanthone derivatives, 2-methyl-1-[4-(methylthio)-phenyl]-2-morpholino-propene-1 and the like a-amino ketone compounds are preferable for more rapid curing. Further, 2-methyl-1-[4-(methylthio)phenyl]2-morpholino-propene-1 is more preferable due to rapid curing as well as good storage stability.

It is possible to use together an amine compound for sensitizing the action of photopolymerization initiator. Photopolymerization initiators decompose into free radicals by ultraviolet light in 3600 angstrom range. Convenient sources of ultraviolet light are available in the form of mercury-arc lamps or fluorescent lamps with special phosphors.

Thermally cured thermosetting resins useful as polymer coatings to be applied by a screen printing process include epoxy, polyvinyl butyryl, polyesters, ionomer, phenolic and polyurethane. For example, the preferred resins are epoxy resins, particularly epoxy resins which have at least two epoxy groups per molecule. Examples of the epoxy resin are polyglycidyl ethers or polyglycidyl esters obtained by reacting a polyhydric phenol such as bisphenol A, halogenated bisphenol A, catechol, resorcinol, etc., or a polyhydric alcohol such as glycerin with epichlorohydrin in the presence of a basic catalyst; epoxy novolaks obtained by condensing a novolak type phenol resin and epichlorohydrin; epoxidized polyolefines obtained by epoxidizing by a peroxide method; epoxidized polybutadienes; oxides derived from dicyclopentadiene; and epoxidized vegetable oils. These epoxy resins can be used alone or as a mixture thereof.

When the thermosetting resin is an epoxy resin about 2 to 30 parts by weight of the curing agent for 100 parts by weight of the epoxy resin is used. Preferably the ratio is about 5 to 15 parts by weight of the curing agent to 100 parts by weight of the resin.

As curing agents for epoxy resins, there can be used actual curing agents which are insoluble in epoxy resins at a resin drying temperature of 176 degrees F. and dissolve at high temperatures to begin curing.

Examples of the curing agent are aromatic polyamines and hydroxyethylated derivatives thereof such as metaphenylenediamine, 4,4'-diaminodiphenylmethane, 4,4'-diaminodiphenylsulfone, 4,4'diaminodiphenyl oxide, 4,4'-diaminodiphenylimine, biphenylenediamine, etc; dicyandizmide; imidazole compounds such as 1-methylimidazole, 2-methylimidazole, 1,2-dimethylimidazole, 2-ethyl-4-methylimidazole, 2-undecylimidazole, 2-heptadecylimidazole, 1-benzyl-2-methylimidazole, 2-phenylimidazole, 1-(2-carbamyl)-2-ethyl-4-methylimidazole, 1-cyanoethyl-2-phenyl-4; 5-di(cyanoethoxymethyl)imidazole, 2-methylimidazole isocyanuric acid adduct, 1-cyanoethyl-2-methylimidazole, 1-cyanoethyl-2-ethyl-4-methylimidazole, 1-azinethyl-2-ethyl-4-imadiazole, 2-methyl-4-ethyl-imidazole trimesic acid adduct, etc.; BF3 amine complex compounds; acid anhydrides such as phthalic anhydride, methyltetrahydrophthalic anhydride, methylnadic anhydride, pyromellitic anhydride, chlorendic anhydride, benzophenonetetracarboxylic anhydride, trimellitic anhydride, polyazelaic anhydride, polysebacic anhydride, etc.; organic acid hydrazides such as adipic dihydrazide, etc; diaminomaleonitrile and derivatives thereof; melamine and derivatives thereof; amine imides, etc.

It is also possible to use a diaminotriazine modified imidazole compound of the formula:

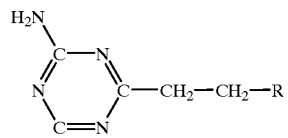

wherein R is a residue of imidazole compound. Examples of such a compound are 2,4-diamino-6{2'-methylimidazole-(1')}ethyl-s-triazine, 2,4-diamino-6{2'-undecylimidazole-(1')}-ethyl-s-triazine, 2,4-diamino-6{2'-methylimidazole (1')}ethyl-s-triazine, and isocyanuric acid adducts thereof.

Among these curing agents, a combination of diaminotriazine modified imidazole and dicyandiamide is particular preferable from the viewpoint of adhesiveness to form ice crystal patterns.

Additionally a compound capable of reacting with an epoxy resin and improving adhesiveness to the surface of the substrate when the epoxy resin coating composition is cured by ultraviolet light exposure may be added.

Examples of such a compound are thiazolines such as 2-mercaptothiazoline, thiazoline, L-thiazoline-4-carboxylic acid, 2,4-thiazolinedione, 2-methylthiazoline, etc.; thiazoles such as thiazole, 4-ethylthiazole, etc.; thiadiazoles such as 2-amino-5-mercapto-1,3,4-thiadiazole, 2,5-dimercapto-1,3,4-thiadiazole, etc.; imidazoles such as 2-mercaptobenzoimidazole, 2-mercapto-1-methylimidazole, etc.; imidazolines such as 2-mercaptoimidazoline, etc., 1-H-1,2,4-triazole-3-thiol, etc. Among them, 2-mercaptothiazoline, 2-mercaptoimidazoline, thiazoline, 2-amino-5-mercapto-1, 3,4-thidiazole, and 1-H-1,2,4-triazole-3-thiol are more effective for improving the adhesiveness between the polymer coating and the glass or plastic substrate.

Figure 4:
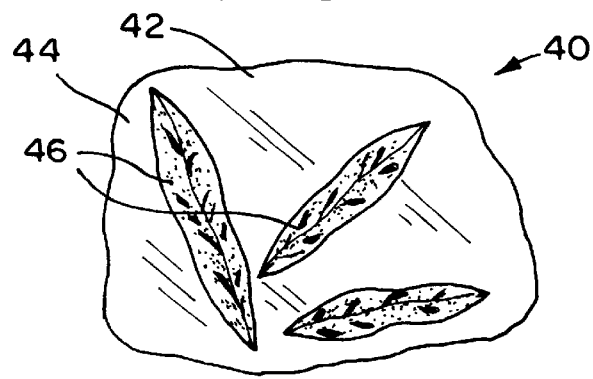
FIG. 4 is a magnified close-up of the fern-like pattern formed within the ice crystal formations.

As mentioned earlier in this disclosure, the frosting pattern produced by the glue chip process produces an undesirable fern-like surface texture. FIG. 4 shows a magnified close-up of such fern-like surface structures 44 within the ice crystal formation pattern on the glass substrate of the perimeter portion of a door panel 40. An overabundance of these fern-like structures or textures is undesirable, since they diminish the natural effect desired in simulated ice crystal formation patterns. Further, the random configuration of the spine 42 and branches 46 in the fern leaf has a deleterious effect in reproducing a natural ice crystal formation. The process of this invention not only produces a more natural ice crystal formation by controlling the number of fern-like structures, and by controlling the configuration of the spines and branches, but the results are reproducible even in high volume production. The final product may contain as much as fifty percent of the fern-like pattern relative to the total surface area of the ice crystal formation, or may be completely devoid of fern-like patterns but preferably less than twenty percent and most preferably contains less than ten percent.

The present invention will be more fully understood from the descriptions of specific examples which follow:

EXAMPLE 1

A thermosetting polymer coating composition was prepared by mixing a bisphenol A epoxy resin (EPIKOTE-828—marketed by Shell Chemical Co.) and dicyandiamine were mixed in a 10:1 parts by weight ratio (resin:catalyst) with about 1 part by weight titanium dioxide (white pigment). A solvent, butyl Cellosolve was added to the mixed components in proper amounts for dissolving and in order to improve the dispersing properties of the coating composition.

Single Coating Process—Thermal Cure

A discontinuous silk screen pattern of a simulated ice crystal formation is positioned on a previously cleaned optically transparent glass sheet. The epoxy coating composition as prepared above is screen printed and selectively deposited only on the exposed regions of the glass substrate. Upon completion of the printing operation, the coated glass sheet passes through a curing oven containing a bank of infra-red lamps which maintains the temperature of between about 310 and 350 degrees F. The workpiece is held in the oven for about 10 minutes. After exiting the curing process station, the coated glass sheet is cooled and then cleaned and transferred for storage and shipping or for further processing or fabrication.

EXAMPLE 2

A photocurable resin coating composition was prepared by mixing diallyl phthalate, trimethylolpropane triacrylate and 2-methyl-1-[4- (methyl)thiophenyl]-2-morpholinopropane-1 in a parts by weight ratio of 25:5:1. To this resin mixture was added a photoinitiator 4,4'-bis (N<N-diethylamino benzophenone in a parts by weight ratio of 62:1 (resin/photoinitiator). About 1 part by weight of titanium dioxide pigment was added. Sufficient solvent, such as butyl Cellosolve was added to aid in dispersing the coating for screen printing.

Single Coating Process—Photocure

A continuous silk screen pattern of simulated ice crystal formation is positioned on a previously cleaned optically transparent glass sheet. The epoxy coating composition as prepared above is screen printed onto the glass sheet. The coated glass sheet is transferred to a curing station. The resin composition was selectively photo cured by exposure to ultraviolet light using a 300 W high pressure mercury lamp for a period of 2 to 4 minutes. After exiting the curing process station, the coated glass sheet is then cleaned and transferred for storage and shipping or for further processing or fabrication.

The processes as shown in Examples 1 and 2 produce simulated ice crystal formations which are devoid of fern-like patterns. Example 3 shows a process where the fern-like pattern is added.

EXAMPLE 3

Multiple Coatings—Different Curing Mechanisms

A discontinuous silk screen pattern of a simulated ice crystal formation is positioned on a previously cleaned optically transparent glass sheet. The thermosetting zing epoxy coating composition as described in Example 1 was screen printed onto the glass sheet. Upon completion of the printing operation, the coated sheet is passed into the curing oven station and thermally cured at about 310 to 340 degrees F. for about 5 minutes. These conditions provide an undercure in order to prevent delamination during subsequent curing operations. After cooling, the first coated glass sheet is transferred to a station, where a silk screen having about ten percent surface area of a fern like pattern, is applied to the surface. A photocurable resin coating composition as described in Example 2 but further including about 0.5 part of a blue pigment is deposited on the glass substrate. Following the second coating, the coated sheet is passed to the curing station and the coating is cured by exposure to ultraviolet light using a 300 W high pressure mercury lamp for about 2 to 5 minutes to completely cure both coatings. After cooling and cleaning, the coated sheet is transferred to an aftertreatment station where a silicone or poliysiloxane coating composition was sprayed on the cured ice crystal formation and then cured at about 100 degrees to 300 degrees F. to impart a hard transparent abrasion resistant coating.

The screen printing process and the subsequent curing steps may be repeated if more colors or passes are needed to yield the desired effect. Other patterns may be screen printed on or around the ice crystal formation such as snowflakes or even different fern-like patterns. The important aspect is that the amount of fern-like patterns can be specifically controlled. However, in these cases, the abrasion resistant coating application and cure is the last step before storage or further fabrication.

There is no criticality in the manner the multi-pass processes are conducted. Example 3 shows a polymer coating which is thermally cured followed by a polymer coating system which is photo cured. The various coating systems are compatible and the above sequence may be reversed with the same excellent results. Any combination and sequence can be employed, i.e., photo cure polymer systems on photo cure polymer systems, as well as, thermally cured polymer systems on thermally cured polymer systems.

What is claimed is:

1. A process for producing an article having a three dimensional optical effect consisting essentially of the steps of:
   a. applying a screen print having a natural ice crystal pattern onto a transparent substrate comprising a flat transparent sheet, a door, a window or a drinking container;
   b. screen printing a polymer coating composition on said substrate;
   c. curing said polymer coating composition to provide a translucent simulated ice crystal formation containing from about 0 to 50 percent of fern-like surface patterns within said formation based on the total surface area of said ice crystal formation.

2. The process of claim 1 wherein said substrate is optically transparent.

3. The process of claim 2 wherein said substrate is tinted with a dye or pigment.

4. The process of claim 1 wherein said transparent substrate is selected from glass or thermoset polymers.

5. The process of claim 4 wherein the surface of said article is selected from flat or curved surfaces.

6. The process of claim 1 wherein said thermoset polymer is made from unsaturated resins selected from acrylic resins, amino resins, polyester resins, phenolic resins, polycarbonate resins, polyurethane resins, urethane resins, vinyl resins and ionomer resins or mixtures thereof.

7. The process of claim 1 wherein said thermosetting resin is an epoxy resin.

8. The process of claim 1 wherein said polymer coating composition is selected from a thermoplastic or thermosetting resin.

9. The process of claim 1 wherein said polymer coating composition material contains a colored pigment or dye.

10. The process of claim 1 wherein a transparent hard anti-abrasive coating is applied to the surface of said ice crystal formation.

11. The process of claim 10 wherein said coating is an organosilicone compound.

12. The process of claim 1 wherein said curing temperature ranges from about 300 to 350 degrees F.

13. A process for producing an article having a three dimensional optical effect consisting essentially of the steps of:
   a. applying a screen print having a natural ice crystal pattern onto a transparent substrate, selected from the groups consisting of a flat transparent sheet, a door, a window and a drinking container;
   b. screen printing a polymer coating composition comprising a thermosetting resin-curing agent mixture;
   c. thermally curing said polymer coating composition to provide a translucent simulated ice crystal formation containing about 0 to 50 percent of fern-like patterns within said formation.

14. A process for producing an article having a three dimensional optical effect consisting essentially of the steps of:
   a. applying a screen print having a natural ice crystal pattern onto a transparent substrate selected from the group consisting of a flat transparent sheet, a door, a window and a drinking container;
   b. screen printing a polymer coating composition comprising a thermosetting resin-curing agent mixture;
   c. partially thermally curing said polymer coating composition to provide a simulated ice crystal formation devoid of fern-like surface patterns within said formation;
   d. cooling said coated substrate having ice crystal formation;
   e. applying a screen print having a fern-like pattern covering less than fifty percent of said partially cured pattern of step c;
   f. screen printing a polymer coating composition comprising a photocurable resin;
   g. fully curing both the thermosetting and photocurable polymers and;

h. cooling said substrate to provide a translucent simulated ice crystal formation having less than fifty percent fern-like patterns within said formation, based on the total surface area of said ice crystal formation.

15. A process for producing an article having a three dimensional optical effect consisting essentially of the steps of:
   a. applying a screen print having a natural ice crystal pattern onto a transparent substrate selected from the groups consisting a flat transparent sheet, a door, a window and a drinking container;
   b. screen printing a polymer coating composition a window or a drinking container comprising a photocurable resin;
   c. photocuring said resin to provide a translucent simulated ice crystal formation devoid of fern-like surface patterns within said formation.

16. The process of claim 15 wherein said polymer coating composition comprises a photocurable resin-photoinitiator composition mixture.

* * * * *